United States Patent Office 3,326,655
Patented June 20, 1967

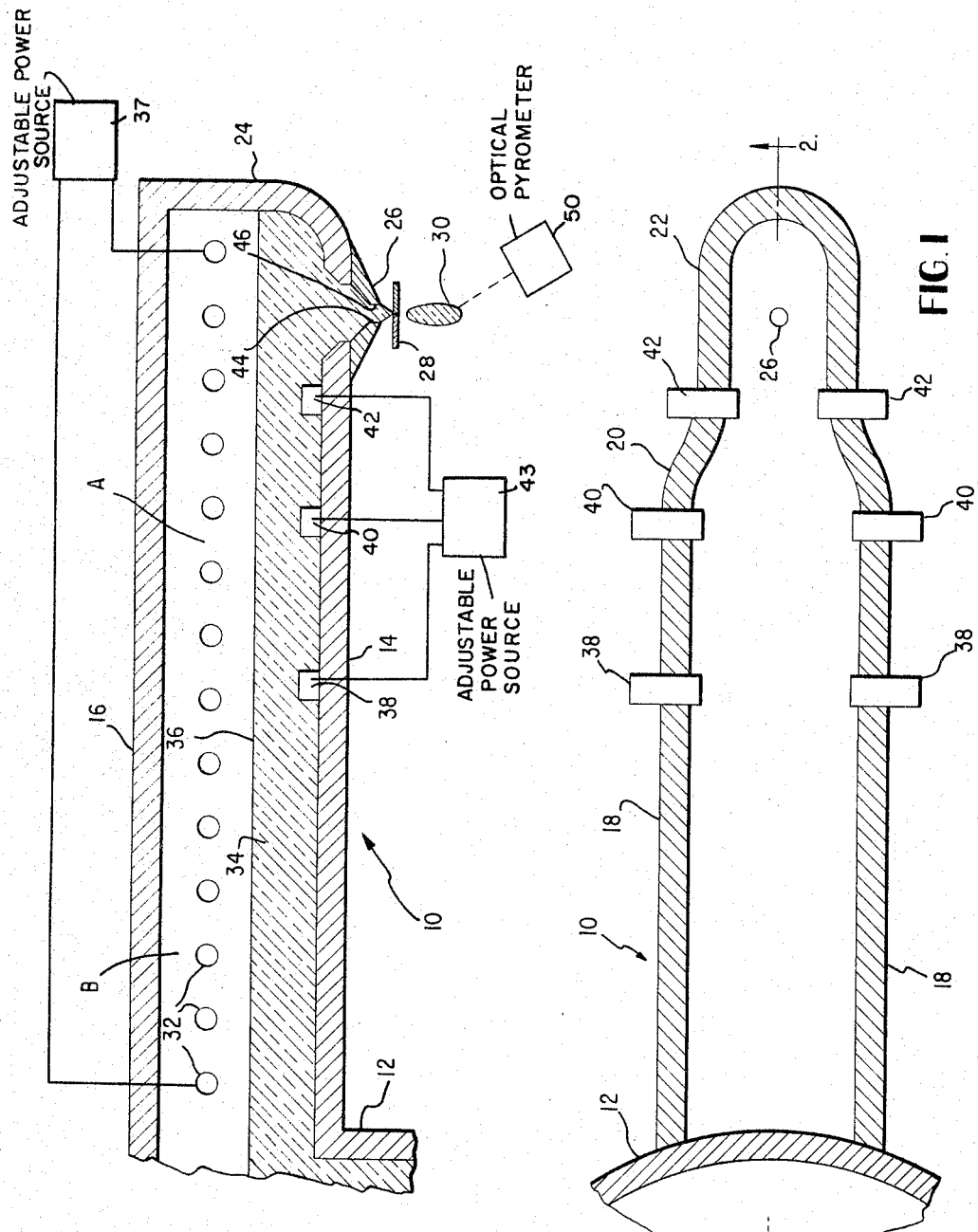

3,326,655
GOB TEMPERATURE CONTROL
Harvey L. Penberthy, 5624 SW. Admiral Way, Seattle, Wash. 98116
Continuation of application Ser. No. 231,505, Oct. 18, 1962. This application June 1, 1966, Ser. No. 554,596
7 Claims. (Cl. 65—128)

The present application is a continuation of my copending application Ser. No. 231,505 filed Oct. 18, 1962 for Gob Temperature Control, now abandoned.

This invention relates to an improved method and apparatus for manufacturing glass and glass products and more particularly relates to an improved forehearth for a glass furnace and a method of operating the same.

In the operation of glass furnaces and the forehearths thereof, difficulty is frequently encountered in withdrawing the glass from the forehearth in such a manner that the withdrawn glass is of a substantially uniform temperature. As an example, in the use of a gob feeder in the manufacture of glass articles, temperature inhomogeneity in the individual gobs can result in non-uniform thickness and strength, and non-uniform optical properties in the finished articles. The problem is well recognized and has been the subject of numerous proposals for solution. As an example, see United States Patents Nos. 1,680,543, 1,928,288, 1,928,289, 1,999,744, 2,919,297, 2,913,509, and British Patents Nos. 892,989 and 892,990.

As most prior workers have recognized, the primary problem is created by heat loss through the walls and floor of the forehearth tending to destroy the temperature homogeneity which at least theoretically exists at the time that the molten glass begins its travel down the forehearth. For the most part, the prior attempts at solving the problem have involved the use of Joule effect electrodes disposed in the forehearth in a position to heat the glass immediately prior to the time that it passes through the delivery outlet. In certain instances, this is accomplished by flowing Joule effect currents through the glass horizontally across the top of the delivery outlet. In more numerous cases, Joule effect currents are flowed from the electrodes in the forehearth in the vicinity of the delivery outlet to a ring type electrode substantially at the delivery outlet and completely or substantially completely surrounding the glass leaving the delivery outlet.

While certain of these proposed solutions have effected a modicum of improvement in the situation, none has completely eliminated the difficulty. As an example, while the arrangements utilizing the ring type electrode have modified the temperature inhomogeneity due to the cooling effect of the forehearth walls, the currents flowing from the electrodes to the ring have themselves produced heated streaks in the glass issuing from the delivery outlet. This in turn causes thin areas in the perimeters of bottles manufactured according to such a process. In other arrangements where specially shaped electrodes are utilized to apply heat to the discharging glass in a more uniform fashion, difficulties arise in obtaining and maintaining the proper spacing and adjustment of the electrodes during operation.

According to the present invention it has now been found that it is possible to provide a temperature homogeneity or uniformity in the discharged glass of a substantially higher quality than that which can be practically achieved by any of the prior methods. In the present invention temperature uniformity in the glass issuing from the delivery outlet of the forehearth is achieved by conditioning the glass in the forehearth prior to the time that it reaches the delivery outlet. The basic principle of the invention is that the glass should be held in what might be called a "heat cocoon" in the terminal portion of its travel to the feeder bowl. The glass should be substantially at the desired orifice temperature at the time that it enters this last zone and the conditioning necessary to compensate for the various heat losses accomplished in the heat cocoon. This is to be contrasted with prior methods in which the attempts to secure temperature homogeneity involved Joule effect heating of the glass in the bowl and in some instances even during its issuance from the orifice.

Thus, the present invention envisions a method and apparatus of feeding glass from a forehearth having an orifice or delivery outlet comprising the steps of feeding molten glass into the forehearth at one end, thereafter feeding it into a heat cocoon at substantially the desired orifice temperature, and withdrawing glass from the orifice while simultaneously conditioning the glass in the heat cocoon by subjecting the surface of the glass to heat from above the surface and creating Joule effect heat in the glass below the surface, and adjusting the rate of introduction of the above surface heat to the rate of introduction of the below surface heat so that the temperature of the glass issuing from the orifice is substantially uniform.

It is accordingly a primary object of the present invention to provide an improved method and apparatus for manufacturing glass.

It is another object of the invention to provide an improved method and apparatus of feeding molten glass from a forehearth.

It is another object of the invention to provide an improved method and apparatus of heating glass from a forehearth which results in improved uniformity of temperature of the gobs in a double gob operation, improved uniformity of temperature around the perimeter of a gob on single gob operation, increased forming speeds, reduced tendency to defects in bottles manufactured from the glass, better distribution of the glass in the finished bottle with resulting higher pressure tests and more uniform optical qualities in the bottles.

It is another object of the invention to provide a method and apparatus of feeding glass from a forehearth having a bowl with a delivery outlet, comprising the steps of feeding molten glass into the forehearth at one end, thereafter feeding the glass into a conditioning zone at an average temperature substantially the same as the desired delivery outlet temperature, withdrawing glass from the delivery outlet at the other end, and conditioning the glass in the conditioning zne before it reaches the bowl by subjecting the glass to heat both from above and below its surface so that the glass issuing from the delivery outlet is of substantially uniform temperature.

It is another object of the invention to provide an apparatus for producing glass including a forehearth connected at one end to a furnace and having a delivery outlet with first and second heating means arranged between the point of connection of the forehearth to the furnace and the delivery outlet, one of such heating means being above the surface level of the glass while the other is below the surface level of the glass, with the rate of introduction of the heat from the first and second heating means being so adjusted that the temperature of glass issuing from the delivery outlet is substantially uniform.

It is another object of the invention to provide an improved method and apparatus for feeding molten glass from a forehearth wherein a substantial uniformity of temperature across the cross section of a gob is achieved by subjecting the glass to a conditioning in the region of the forehearth immediately upstream of the bowl, and adjusting the ratio of sub-surface heating to above-surface heating in that region.

These and further objects and advantages of the invention will become more apparent upon reference to the following specification and claims and the appended drawings wherein:

FIGURE 1 is a horizontal section of a forehearth constructed according to the present invention; and FIGURE 2 is a vertical section of the forehearth of FIGURE 1 taken approximately along the line 2—2 of FIGURE 1.

Referring more particularly to the figures of the drawing, there is indicated generally at 10 a forehearth in the conventional form of a trough having an inner lining of refractory material which resists the action of glass and heat. The trough is connected to the working zone 12 of a suitable glass furnace and comprises a floor 14, roof 16 and opposed side walls 18. Referring to FIGURE 1, the width of the forehearth is necked down at 20 to terminate in the conventional bowl 22 having an end wall 24. The bowl 22 has a delivery outlet or orifice 26 at its bottom from which the molten glass issues. A suitable shearing device 28 may be provided to form gobs of glass 30 in a conventional manner.

A first heating means is provided in the forehearth in the form of adjustable gas burners or electric heating elements 32 which are disposed along the length of the forehearth and which subject the surface 36 of the molten glass 34 to above surface heat. An adjustable power source 37 is connected in conventional fashion to heating elements 32 to control the quantity of heat provided, as will be understood by one skilled in the art. A second means for feeding heat into the glass in the forehearth is provided in the form of a series of Joule effect electrodes 38, 40 and 42, disposed at the floor of the forehearth, which are connected to one or more suitable power sources shown in FIGURE 2 as adjustable power source 43 so as to create Joule effect currents through the glass in the forehearth.

The method of operation according to the invention comprises utilization of the portion of the forehearth immediately preceding the bowl and delivery outlet as a conditioning zone or heat cocoon which places the glass in such a condition that after it issues from the delivery outlet it is at a substantially uniform temperature. This zone is indicated at A in FIGURE 2. Thus, the glass is heated by the electrodes 38, 40 and 42 to compensate for the heat losses from the side walls and floor of the forehearth and is heated by the above surface heat source 32 to compensate for the heat losses through the superstructure of the forehearth in that section. According to the invention, the glass entering his special conditioning section of the forehearth has an average temperature which is substantially the same as the desired temperature of the final gob, so that the average temperature of the glass in this conditioning section is neither being raised nor lowered. This permits the glass to even out its own temperature differences by radiation and conduction.

In the conventional forehearth the glass enters the forehearth at a temperature higher than the desired gob temperature and therefore some cooling is necessary before the glass arrives at the orifice. According to the present invention this cooling, where necessary, is accomplished in the section of the forehearth upstream of the conditioning zone A, or, as is indicated in FIGURE 2, in the zone B. However, while this is normally a cooling zone, it is desirable to provide above surface heat and sometimes sub-surface heat in order to control the rate of cooling of the glass to insure that it enters conditioning zone A at an average temperature which is substantially the same as the desired orifice temperature. This apparatus and mode of operation is to be clearly distinguished from certain prior procedures, such as disclosed in U.S. Patents Nos. 1,928,288 and 1,928,289, wherein the forehearth is provided with an initial cooling zone that drops the temperature of the glass below the temperature desired in the charge.

A further feature of the invention is the desirability of substantially eliminating Joule effect heating in the bowl. The reason for this is as follows: When electric current flows between two electrodes in a glass mass there is always a preferred current path between the electrodes dependent primarily upon the local temperature conditions in the glass. In a forehearth the glass temperatures are relatively low and the slope of the resistance-temperature curve is steep. The initial current flow through the preferred path heats the glass therein thereby lowering its resistance and making the path an even more preferred one. This results in a hot streak of glass and when it exists in the bowl it almost always produces a hot streak of glass in the gob. As a result, the preferred embodiment of the present invention comprehends a substantial absence of Joule effect heating in the bowl. As a practical matter very small amounts of Joule effect heating may be tolerated in the bowl but this must be only a very small fraction of the amount which occurs in the conditioning zone A. As an example, 10 watts of Joule effect heating in the bowl would produce no ill effects, while 10 kilowatts would be disastrous to the results desired. The amount which can be tolerated will depend upon the geometry and operating conditions of the installation. As stated, the preferred embodiment of the invention comprehends a substantial elimination of Joule effect heating in the bowl.

The flow of glass through a forehearth is complex and is not precisely understood because of the difficulty of investigation. However, certain phenomena have been ascertained. In a conventional fuel fired forehearth there are four main sources of thermal inhomogeneity in the gobs: (1) The temperature gradient downward through the glass caused by heat losses through the bottom of the channel which are made up by the fuel fire over the top of the glass; (2) The sharp temperature gradient (skin effect) in the thin layer of glass immediately adjacent a cooled refractory wall. This layer flows slowly toward the orifice; (3) The channeling effect which occurs because the hotter glass tends to flow through the central portion of the channel, further aggravating temperature differences due to bottom heat loss; and (4) the cycling of temperature following gob-weight adjustments. When the gob weight is increased, glass flows faster along the channel, and soon the glass arriving at the orifice is hotter because it has had less time to cool. Hotter glass at the orifice means heavier gobs, and the operator must adjust the feeder to reduce the gob weight. The cycle then goes in a reverse direction, and so on.

It is of the essence of the present invention that the undesired effects of these varied causes of thermal inhomogeneity are combatted en mass by delivering the glass to the heat cocoon of conditioning zone A at substantially the desired orifice temperature, and then adjusting the ratio of sub-surface heat to above surface heat in zone A empirically to bring about a uniformity of temperature around the circumference of the gobs as measured, for example, by an optical pyrometer shown at 50 in FIGURE 2. Optical pyrometer 50 may be of any commercially available type such as that sold under the name Pyro by the Pyrometer Instrument Company, Inc., of Bergenfield, N.J. Other means of observing the desired operating conditions may be resorted to. Thus, thermocouples may be installed in the conditioning zone A to measure glass temperatures at the surface of the glass and at the floor of the forehearth. Observations may then be made to correlate these readings with the desired gob temperatures and control may thereafter be predicated on the thermocouple readings. The end result in either method is the same, i.e., the temperature around the periphery of the gobs is maintained at a uniform level. The simpler method is that of measuring the temperature of the gob surface around its perimeter with an optical pyrometer and then adjusting the heat ratio to equalize the perimeter temperature to the maximum extent possible. With such an arrangement, it is found that the temperature difference around the perimeter of the gobs can be held equal within the accuracy of measurement of the pyrometer. This has proven to be a highly satisfactory method of control susceptible of easy adjustment and maintenance.

When utilizing the method and apparatus of the invention, it has been found possible to achieve a substantial uniformity of temperature in the output of the forehearth with the following benefits: (1) More even distribution of the glass in the sidewalls of containers being manufactured with a concomitant increase in pressure test. As an example, the industry average pressure test for a representative sample of cone-top stubby beer bottles was 150 p.s.i. On the other hand bottles from an installation of the forehearth of this invention tested 190–200 p.s.i.; (2) Less trouble with checks on the finish; (3) Easier double gob mold operation. With double gob amber glass operation, it has been observed that the temperatures from one side of one gob to the other side of the other gob can be different by as much as 20° F. In such a case the mold will probably be too cold for one gob and too hot for the other. With the method and apparatus of this invention the gob temperatures are equal and the mold-gob temperature relationship is the same for both gobs; (4) Machine speeds can be increased. As an example, in one installation of the method and apparatus of the invention, speed was increased from 76 to 82 bottles per minute, with a small increase in percentage pack; and (5) Closer control of gob weight.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A forehearth having an upstream end connected to a furnace and having a bowl and delivery orifice at the downstream end, said forehearth constituting a trough having therein a substantially uniform depth of molten glass from said upstream end to said bowl, heating means in a first zone immediately upstream of said bowl for subjecting said molten glass in said first zone to above surface heat and to low level sub-surface Joule effect heat, heating means in a second zone in said forehearth immediately upstream of said first zone for controlling the average temperature of the glass flowing to said first zone so that the average temperature of the glass flowing from said second zone to said first zone is substantially the same as the temperature of the glass issuing from said orifice, means for determining the temperature of the glass issuing from said orifice, and means for adjusting the intensity of heat created by said heating means in said first zone and the ratio of above surface to sub-surface heat in said first zone so that glass passing through such first zone remains at substantially the same average temperature and so that glass issuing from said orifice is of substantially uniform temperature as indicated by said means for determining temperature.

2. A forehearth as set out in claim 1 wherein said means for creating sub-surface Joule effect heat comprises Joule effect electrodes entering said forehearth immediately upstream of said bowl.

3. A forehearth as set out in claim 2 wherein the Joule effect electrodes in said forehearth are so arranged that substantially no Joule effect heating occurs in said bowl.

4. A forehearth as set out in claim 1 wherein said trough is of substantially uniform width from said upstream portion to said bowl.

5. A method of feeding glass from a forehearth having an upstream portion into which glass is delivered from a furnace and a downstream bowl with an orifice from which glass is withdrawn, the molten glass in said forehearth having substantially uniform depth from said upstream portion to said bowl, comprising the steps of determining the temperature of the glass issuing from the orifice, subjecting the glass in a region immediately upstream of said bowl to above surface heat and to sub-surface Joule effect heat, conditioning the glass immediately upstream of said region so that its average temperature as it reaches said region is substantially the same as the temperature of the glass issuing from said orifice, and adjusting the rate of subjection of said above surface and sub-surface heat and the ratio of said above surface and sub-surface heat so that the glass passing through said region remains at the same average temperature and the glass issuing from said orifice remains at the same average temperature.

6. A method as set out in claim 5 including the step of confining the downstream excursion of said Joule effect heat substantially to said region so that substantially no Joule effect heating occurs in said bowl.

7. A forehearth as set out in claim 1 wherein the heating means in said first zone includes above-surface heaters and Joule effect electrodes disposed below the surface of the molten glass and wherein said adjusting means comprises separate adjustable power sources individually connected to the Joule effect electrodes, and to the above-surface heaters.

References Cited

UNITED STATES PATENTS

| | | | |
|---|---|---|---|
| 1,944,855 | 1/1934 | Wadman | 65—347 X |
| 3,133,803 | 5/1964 | Denman | 65—134 |

DONALL H. SYLVESTER, *Primary Examiner.*

A. D. KELLOGG, *Assistant Examiner.*